May 18, 1965 W. C. GILMAN ETAL 3,184,047
TRAY
Filed May 17, 1963 2 Sheets-Sheet 1

May 18, 1965 W. C. GILMAN ETAL 3,184,047
TRAY
Filed May 17, 1963 2 Sheets-Sheet 2

ID
3,184,047
TRAY
Wayne C. Gilman, Spartanburg, and Richard O. Kuehne, Taylors, S.C., assignors to W. R. Grace & Co., Duncan, S.C., a corporation of Connecticut
Filed May 17, 1963, Ser. No. 281,246
2 Claims. (Cl. 206—45.34)

This invention relates to an improved construction of trays, and in particular to an improved tray useful for packaging products which must be ventilated while packaged. The invention further relates to packages made with such trays.

It is known that packages of certain products must be ventilated in some way if the product is to have a normal satisfactory shelf life. Examples of such products include fruits such as oranges, apples, pears, grapes and others and vegetables such as potatoes, onions, mushrooms and others. Ventilation is obtained at present by storing and selling such products in bulk or in open mesh bags. It has also been proposed to place the products in a tray and use an overwrapping thin, transparent film of cellophane, polyethylene or the like that has been slit in a predetermined pattern. When the film sheet is pulled tightly over the product in the tray the slits open up to provide ventilation holes (see e.g. U.S. Patent 3,016,131).

It is an object of this invention to provide a fruit and produce tray that assures ventilation of product without requiring use of a special pre-slit film cover sheet.

Another object of the invention is to provide a fruit or produce package having an impermeable film cover sheet and yet having adequate product ventilation under all circumstances.

Still another object is to provide a fruit or produce packaging tray that also has utility as a serving tray.

Other objects and advantages of the invention will be apparent after study of the following more detailed disclosure, the accompanying drawings and the appended claims. In the drawings:

FIGURE 1 is a top plan view of a fruit or produce tray made in accordance with the invention.

FIGURES 2 and 3 are sectional views taken on lines 2—2 and 3—3 of FIGURE 1.

Figure 1:
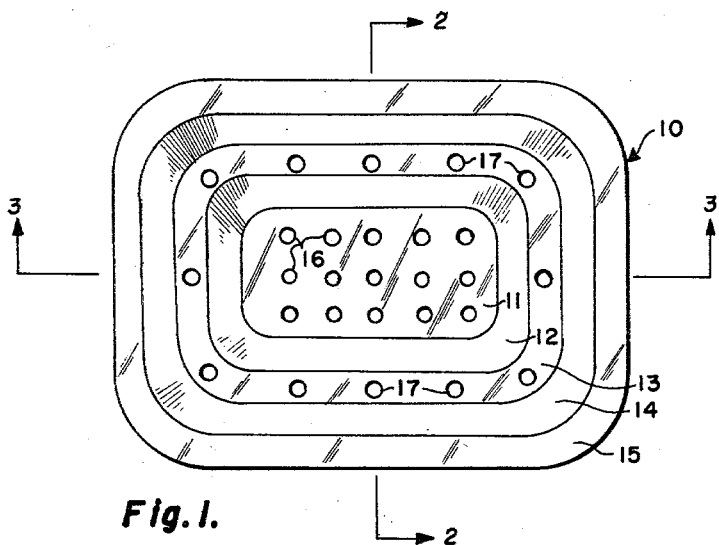
Figure 2:
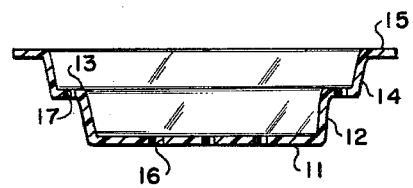
Figure 3:
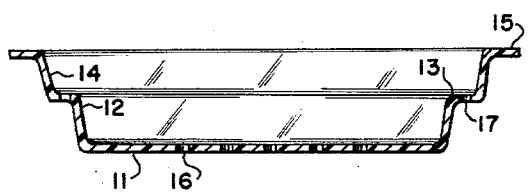

As seen in the drawings, especially FIGURES 1, 2 and 3, the tray of this invention, generally designated as 10, comprises a bottom portion 11, an upwardly extending inner boundary wall 12 completely surrounding the periphery of the bottom portion; a laterally extending step portion 13, substantially parallel to the bottom portion and completely around the upper periphery of wall 12; an upwardly extending outer boundary wall 14 completely around the outer periphery of step portion 13; and finally a laterally extending flange 15, substantially parallel to the bottom portion and to the step portion and extending completely around the upper periphery of the wall 13. In order to permit stacking of a plurality of the trays in nested relation each of the boundary walls 12 and 14 are preferably flared at least slightly outwardly, as best seen in FIGURES 2 and 3.

Figure 4:
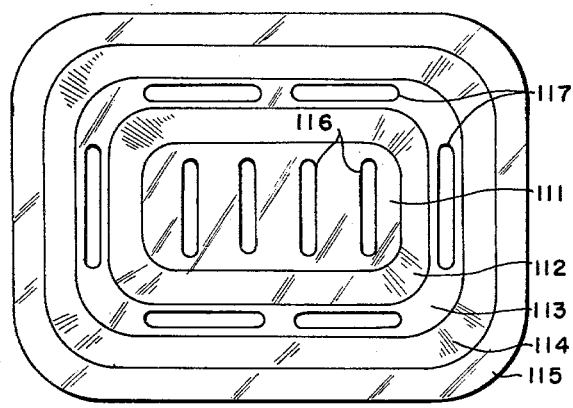
FIGURE 4 is a plan view of another tray made in accordance with the invention.

The tray of this invention must have a plurality of apertures 17 in the step portion 13. It is not necessary but usually found preferable to also provide a plurality of apertures 16 in the bottom portion 11. The configuration and spacing of the respective apertures is not particularly critical. Thus, as illustrated in FIGURE 4, the apertures may be elongated slots 116 and 117 rather than generally circular as in FIGURES 1 to 3.

In order to retain sufficient rigidity in the tray it is necessary to maintain the ratio of total aperture area to total surface area of the step portion (and to total surface area of the bottom portion, where applicable) at a value of about 0.5 or less. On the other hand, for adequate, proper ventilation there must be separate, spaced plural apertures in the step portion and the total area of such separate, spaced plural apertures must be at least about 5 percent of the total surface area of the step portion. In other words, the minimum ratio of the respective areas must be at least 0.05.

For suitable stacking stability the planar surface area of the circumferential step portion 13 must not be greater than about one-third (⅓) of the planar surface area of the bottom portion. The minimum surface area of the step portion is dictated solely by practical considerations, i.e., it must be sufficiently great to permit provision of plural apertures therein.

The distance between the bottom portion and the step portion (i.e., the vertical height of the inner boundary wall 12) must be sufficient to permit air flow through the apertures in the step portion. As a practical minimum the distance between these two portions should be at least about 10 percent of the total vertical height of the tray. Usually it is preferred to have the vertical heights of the two boundary walls about equal so that the step portion is located about midway between the bottom portion 11 and the top flange 15.

The tray can be made from any of a wide variety of rigid or semi-rigid materials, e.g., metal such as aluminum or tin plate, rigid polystyrene, cardboard, pulpboard, rigid polyvinyl chloride and the like.

The tray may have any desired color to harmonize with product packaged therein or to give added eye-appeal. It may be desirable in some cases to use uncolored transparent or translucent plastic material for making the tray in order to provide optimum viewing of the packaged product.

Packages of this invention comprise an apertured "stepped" tray as described above, together with product therein, and a shrink cover made from a sheet of thin, transparent, heat shrinkable thermoplastic film. The shrink cover can be applied in known manner. One suitable method of preparing the package of the invention is described in Carpenter et al.—U.S. Patent 3,034,271, the entire disclosure of which is incorporated herein by reference.

Figure 5:
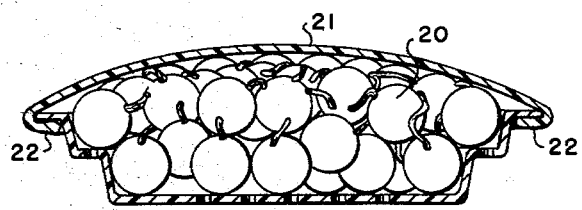
FIGURE 5 is a sectional view of a package of this invention utilizing the tray of FIGURE 1.

FIGURE 5 illustrates a typical package of this invention. In FIGURE 5, the tray is constructed as shown in FIGURES 1 through 3. The illustrated product is a bunch of grapes 20. The shrink cover 21 was applied as described in the Carpenter et al. patent mentioned above. The peripheral edges 22 of the film cover sheet were shrunk tightly under and completely around the flange 15 of the tray. The cover was made from a sheet of heat-shrinkable irradiated, biaxially oriented polyethylene film such as the film described, for example, in Baird et al.—U.S. Patent 3,022,543. Other analogous film materials could also be used.

It was found that the package was quite adequately ventilated through the apertures in the tray bottom and step portions. Even when the tray was placed with the bottom portion on a flat supporting surface ventilation through the apertured step portion was sufficient to maintain normal, adequate storage life for the packaged grapes. Since the film cover sheet completely covers the product, there is no atmospheric dust or dirt contamination of the product and, as an added advantage, product damage resulting from handling abuse is greatly reduced. Furthermore visibility through the cover sheet remains excellent throughout the storage period since circulation of air through the package interior precludes any moisture condensation on the inside film surface.

It will be obvious that various changes may be made in the form, size, proportion and minor details of construction of the tray and package of this invention. Thus, while the foregoing description is necessarily detailed, it is to be understood that the spirit and scope of the invention is to be limited only insofar as indicated in the appended claims.

What is claimed is:

1. A tray especially suitable for packaging comprising:
   (a) a bottom portion having a plurality of separate spaced apertures therethrough,
   (b) a solid inner boundary wall extending upwardly from and completely surrounding the outer periphery of said bottom portion and diverging slightly outwardly from said periphery,
   (c) a step portion extending around the upper periphery of said inner wall on a plane substantially parallel with said bottom portion, said step portion having a planar surface area not greater than about ⅓ of the planar surface area of the bottom portion, and said step portion being positioned about midway between the bottom portion and the hereinafter described flange,
   (d) an outer boundary wall diverging slightly outwardly from and completely surrounding the outer periphery of said step portion,
   (e) a laterally extending flange completely around the upper periphery of said outer boundary wall on a plane substantially parallel to said bottom and step portions,
   (f) said step and bottom portion only having a plurality of separate spaced apertures therethrough, and
   (g) said bottom portion, inner wall, step portion, and outer boundary wall forming a product receptacle.

2. A package comprising, in combination:
   (a) the tray of claim 1,
   (b) product positioned in said tray, and
   (c) a taut sheet of thin flexible thermoplastic film lying over said product and said tray, said sheet having its peripheral edges tightly engaging the under portion of said flange.

References Cited by the Examiner
UNITED STATES PATENTS

| | | | |
|---|---|---|---|
| 1,263,103 | 4/18 | Pfeil | 220—23.8 |
| 2,738,914 | 3/56 | Hatch | 229—2.5 |
| 2,814,427 | 11/57 | Emery | 229—2.5 |
| 2,918,379 | 12/59 | Lurie | 229—2.5 |
| 2,975,931 | 3/61 | Harrison. | |
| 3,104,044 | 9/63 | Reifers | 229—2.5 |

FRANKLIN T. GARRETT, *Primary Examiner.*